March 28, 1939.   E. S. PURINGTON   2,152,325
ALTITUDE DETERMINING SYSTEM FOR AIRCRAFT
Filed Sept. 16, 1937   2 Sheets-Sheet 1

INVENTOR
ELLISON S. PURINGTON
BY
ATTORNEY

INVENTOR
ELLISON S. PURINGTON
BY
ATTORNEY

Patented Mar. 28, 1939

2,152,325

UNITED STATES PATENT OFFICE 2,152,325

ALTITUDE DETERMINING SYSTEM FOR AIRCRAFT

Ellison S. Purington, Gloucester, Mass., assignor to John Hays Hammond, Jr.

Application September 16, 1937, Serial No. 164,113

14 Claims. (Cl. 250—1)

This invention relates to altitude determining means and more specifically to a system for apprising the navigator of an aircraft of his distance above the ground.

An object of the invention is to provide a novel and improved system of the above type. Another object of the invention is to provide a system for transmitting radiant energy which produces a definite interference pattern in space with points of maximum intensity located at predetermined positions with respect to the transmitter.

Another object is to provide a receiving system for receiving the interference pattern produced by the transmitter and indicating either visually or aurally the positions of maxmimum intensity.

A further object of the invention is to provide means for determining the number of maxima encountered by the aircraft in a predetermined interval of time and thereby automatically indicating the distance of the aircraft above the ground.

A still further object of the invention is to provide means for compensating for the speed of the aircraft in determining the altitude.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description, taken in connection with the accompanying drawings forming a part thereof, in which—

Figure 1:
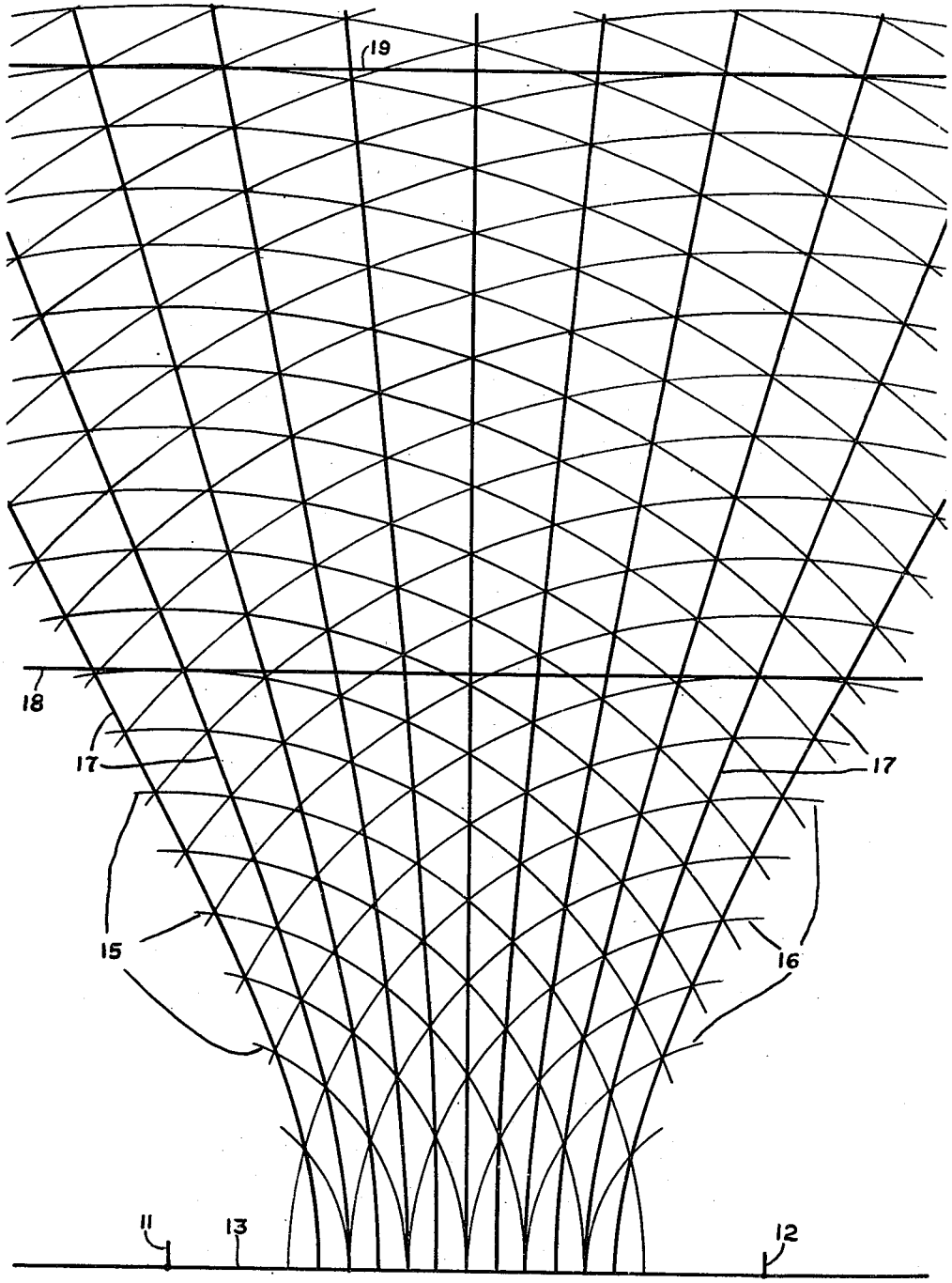
Figure 2:
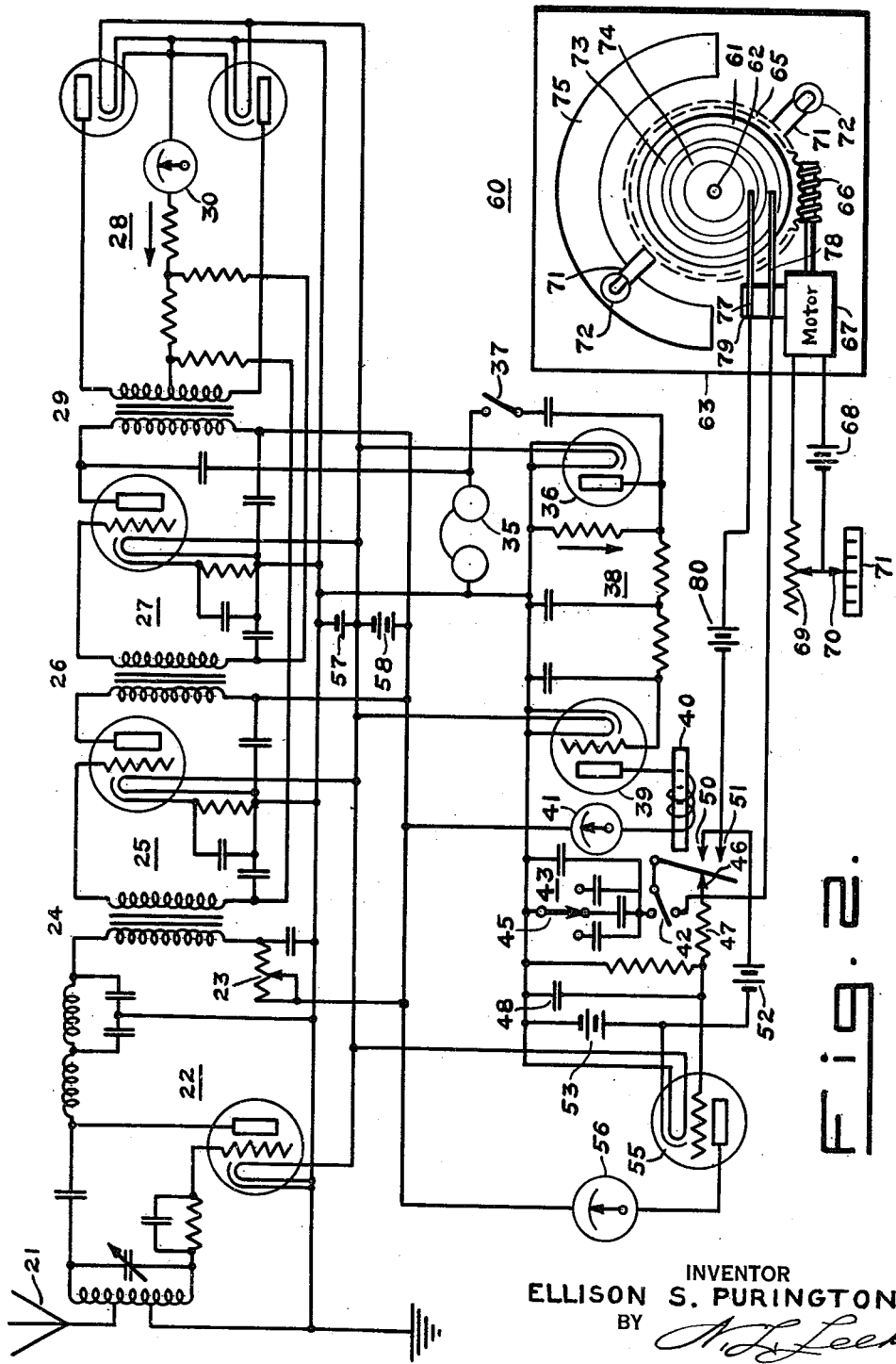

Fig. 1 illustrates diagrammatically the interference pattern formed in space in accordance with this invention; and Fig. 2 illustrates schematically a receiving circuit and altitude indicator constructed in accordance with this invention.

In the following description and in the claims parts will be identified by specific names for convenience, but they are intended to be as generic in their application to similar parts as the art will permit.

Referring to the drawings and more particularly to Fig. 1 there is shown a diagrammatic view of the interference pattern formed in space by the energy radiated from two transmitters 11 and 12 located on the ground 13 and in line with the direction of flight of the aircraft. The two transmitters 11 and 12 are excited at the same radio frequency and are modulated by the same audio frequency. The modulations are preferably in phase but the carriers need not necessarily be in phase. For convenience, however, it is assumed that the two transmitters 11 and 12 are in phase and behave as two point sources of radiation separated by an integral number of wave lengths, which in Fig. 1 has been taken as 10.

The two series of arcs 15 and 16 represent lines of maximum instantaneous amplitude of the radiations from the two transmitters 11 and 12 respectively. Where the arcs 15 and 16 intersect there will be produced radiant energy fields of maximum intensity due to the fact that the two radiations will be in phase. At points half way between these there will be produced radiant energy fields of minimum intensity due to the fact that the radiations will be 180° out of phase.

The curved lines 17 are drawn through the points of maximum field strength represented by the points of intersection between the two sets of curves 15 and 16. The horizontal line 18 is drawn at a height above the ground equal to the distance between the two antennas 11 and 12 and the horizontal line 19 is drawn at a distance of twice this height above the ground.

It will be evident from Fig. 1 that the lines 17 become essentially straight lines above the horizontal line 18 and that, if extended as straight lines, they intersect at a point midway between the two antennas 11 and 12 and slightly below the ground level. From this fact it is evident that the number of maxima which would be intercepted in a given horizontal flight would be essentially proportional to the altitude of the aircraft above the ground and would vary inversely as the altitude, that is the number intercepted while traversing a given horizontal distance at any given altitude would be approximately equal to twice the number that would be intercepted at twice that altitude while traversing the same horizontal distance. This would hold good for altitudes above the line 18 which in practice might be of the order of only 150 feet.

For determining the number of maxima encountered in a given horizontal distance any suitable receiving system may be used. A typical receiver is shown in Fig. 2. This receiver comprises an antenna 21 which is connected to a standard detector such as a regenerative tuner 22, with regeneration control by plate voltage. Any other receiving system such as a tuned radio frequency receiver, superheterodyne or the like may be used if desired. The output circuit of the tuner 22 is shown as provided with a potentiometer 23 for regeneration control and is connected through a transformer 24 to the first stage 25 of an audio amplifier. The output of this stage is connected through a transformer 26 to the second stage 27 of the audio amplifier. The audio amplifiers are of standard construction and are preferably of the constant volume type.

For purposes of automatic volume control a rectifier 28 is provided which is connected to the output of the second stage of the audio amplifier by a transformer 29. This rectifier 28 is provided with a meter 30 for measuring the amount of rectified current which flows in the direction of the arrow. The rectifier 28 may, for purposes of maintaining constancy of volume, be connected to either the tuner circuit or to the audio amplifier or both, but in this case is shown for convenience as connected to the two stages 25 and 27 of the audio amplifier. It is to be understood that a particular type of receiver has been shown for purposes of illustration and that any standard radio receiver preferably of the constant volume type may be substituted therefor.

Across the output circuit of the second stage 27 of the audio amplifier is connected a pair of head phones 35 and a rectifier 36. A switch 37 is provided for connecting or disconnecting the rectifier 36. The output circuit of the rectifier 36 is connected to a filter 38 for filtering out the audio frequencies. The fluctuating D. C. output of this filter is impressed upon the grid of a tube 39, the plate current of which passes through the winding of a relay 40 and a sluggish meter 41.

The armature of the relay 40 is connected to the blade of a single pole double throw switch 42. One contact of the switch 42 is connected through a bank of condensers 43 to ground. A multipoint switch 45 is provided for varying the effective capacity of the bank of condensers 43. The relay 40 is provided with a back contact 46, which is connected through a resistor 47 and a condenser 48 to ground. The relay 40 is also provided with two front contacts 50 and 51, the former being connected through two batteries 52 and 53 to ground.

Across the condenser 48 is connected the input circuit of a tube 55 the output circuit of which includes a meter 56. Suitable filament and plate batteries 57 and 58 are provided to supply the various tubes with filament current and plate potential.

For providing a luminous indication of the number of maxima encountered in a given horizontal distance the indicator 60 is provided. This indicator comprises a circular disc 61 of insulating material rotatably mounted on a shaft 62 which is secured to a casing 63. Secured to the disc 61 is a worm wheel 65, which meshes with a worm 66 fastened to the shaft of a motor 67. This motor may be driven from any suitable source of power such as a battery 68 and its speed may be controlled by a rheostat 69. The adjustable contact of this rheostat may be provided with a pointer 70, indicating on a scale 71, which may be graduated in miles per hour.

Secured to the disc 61 are two arms 71 on the ends of which are mounted two lamps 72. The filaments of these lamps are connected in parallel to two slip rings 73 and 74 mounted on the disc 61. A semicircular segment of transparent material 75 is mounted in a slot of the same shape cut in the casing 63. The transparent material 75 is coated with a luminescent material which is excited when the lamp 72 is lit and will remain luminescent for a brief interval of time.

The two slip rings 74 and 73 are engaged by two brushes 77 and 78 mounted on a base 79 of insulating material, which is secured to the casing 63. The brush 77 is connected through a battery 80 to the contact 51 and the brush 78 is connected to a pole of the switch 42.

In the operation of the receiver shown in Fig. 2 the energy radiated by the antennas 11 and 12 shown in Fig. 1, which as already stated are excited at the same radio frequency and are modulated at the same audio frequency, is received by the antenna 21 and is amplified by the regenerative tuner 22. The regeneration of this circuit is controlled by the potentiometer 23 which regulates the plate voltage applied to the tuner circuit.

The output of the regenerative tuner 22 passes through the transformer 24 to the two stages 25 and 27 of the audio amplifier where the audio currents are amplified and pass to the head phones 35. Part of the output of the second stage of the audio amplifier passes through the transformer 29 to the rectifier circuit 28 which acts in a well known manner upon the two stages 25 and 27 of the audio amplifier to maintain constancy of volume so that the received signal is fairly independent of altitude. The strength of the rectified current as indicated by the reading of the meter 30 may be used as a rough indication of the height of the aircraft above the ground.

The head phones 35 will indicate when the aircraft is passing through the points of maximum field intensity, as shown by the points of intersection of the lines 15 and 16 in Fig. 1, and may be used for counting the number of these maxima encountered in a given horizontal distance, such for example as a half a mile. The time necessary for the aircraft to cover this horizontal distance may be deduced from the speed of the aircraft as shown by the air speed indicator, so that it will only be necessary for the navigator to count the number of maximum signals in the head phones 35 in a given interval of time and to then find the altitude from a suitable table.

If it is desired to use the automatic indicating means 56 the switch 37 is closed and the switch 42 is thrown up. Part of the phone current will then be rectified by the rectifier 36 and the audio component will be filtered out by the filter 38. The resulting fluctuating D. C. current will then be impressed upon the grid of the tube 39 causing plate current to pass through the winding of the relay 40 and meter 41.

The sensitivity of the receiver is so adjusted that normally the sluggish meter 41 reads the average value of the current passing through the relay 40 and the relay operates when the current passing through its winding attains this average value, so that it is closed about half the time and open about half the time. This condition does not need to be exactly maintained, however, in order for the apparatus to function properly.

When the relay 40 is closed a circuit will be formed from the battery 52, contact 50, armature of relay 40, switch 42, condenser bank 43 and battery 53 back to battery 52, thus charging the condenser bank 43 which has a rapid charge and discharge constant. When the relay 40 is open a circuit will be formed from the condenser bank 43, switch 42, armature of relay 40, contact 46 resistor 47, and condenser 48 back to condenser bank 43, which will allow the condenser bank 43 to discharge into the condenser 48. The latter has a suitably long time constant so that it is maintained at a uniform potential by successive charges received from the condenser 43.

As the time constant of the condenser bank 43 is fast it will be fully charged at each operation of the relay 40 and the charge transferred to the condenser 48 will depend on the number of operations of the relay 40 per second. A voltage is thus built up upon the grid of the tube 55 which is proportional to the number of operations of the relay 40 per second. The meter 56 registers the plate current of the tube 55 which is proportional to the grid voltage and therefore to the number of operations of the relay 40, which is proportional to the number of maxima encountered in a given horizontal distance.

The length of time required by the air craft to travel the given horizontal distance is dependent upon its speed and therefore the time constant of the condenser bank 43 must vary with the speed of the aircraft in order for the indication of the meter 56 to be independent of speed. This variation is produced by cutting in different sets of condensers by means of the switch 45 the points of which may be designated by numerals representing various speeds.

In the operation of this system the navigator sets the switch 45 to correspond to the known speed of the aircraft and then reads his altitude directly on the meter 56 which may be calibrated to read the altitude of the aircraft above the ground. The calibration of this meter may be done by determining the various constants of the circuits and with reference to the number of maxima encountered at various altitudes as shown in Fig. 1.

If it is desired to use the indicator 60, the switch 42 is thrown down so that each time the relay 40 is closed it completes a circuit from the battery 80 contact 51, armature of relay 40, switch 42, brush 78, slip ring 73, filaments of lamps 72, slip ring 74 and brush 77 back to the battery 80, thus lighting the lamps 72. As these lamps move behind the segment 75 they will produce a luminescent spot on this segment each time the relay 40 operates.

The pointer 70 of the rheostat 69 is set on the scale 71 to a position corresponding to the speed of the aircraft, thus causing the motor 67 to run at such a speed that the lamp 72 will move across the entire segment 75 while the aircraft traverses the given horizontal distance. In this way the number of times the lamp 72 lights behind the segment 75 will equal the number of maxima encountered in the given horizontal distance, so that the number of luminous spots produced on the segment 75 will equal the number of maxima encountered. The navigator may therefore determine his altitude by counting these luminous spots and referring to a suitable table as when using the head phones 35.

The indicator could be made to operate in other ways. For example the motor speed could be regulated to cause a single light spot to appear stationary on the screen. The speed of the motor, as indicated by the scale 71 which would be calibrated for a given speed would then designate the frequency of the maxima which, as above described, is inversely proportional to altitude. Any other suitable indicating means responsive to received radio signals and capable of indicating frequency of recurring maxima and minima could be substituted for that above described if desired.

Although a specific embodiment of the invention has been shown for purposes of illustration it is to be understood that the invention is capable of various uses and that various changes and modifications may be made therein as will be readily apparent to a person skilled in the art. The invention is only to be limited in accordance with the following claims when interpreted in view of the prior art.

What is claimed is:

1. The method of determining altitude which comprises propagating and directing upwardly radiant energy waves to form an interference pattern in space the points of maxima of which are separated by a distance proportional to altitude, counting the number of maxima encountered in traveling a given horizontal distance and calculating therefrom the altitude.

2. The method of determining altitude which comprises propagating and directing upwardly radiant energy waves to form an interference pattern in space the points of maxima of which are separated by a distance proportional to altitude, determining the frequency at which maxima are encountered in horizontal travel and calculating therefrom the altitude.

3. The method of determining altitude from an interference pattern of radiant energy the maxima of which are separated by distances proportional to altitude, which comprises counting the number and frequency of the maxima encountered in a given horizontal distance and calculating therefrom the altitude.

4. A system for determining the altitude of an aircraft, which comprises a pair of radiant energy transmitters propagating energy to form an interference pattern in space having successive surfaces of maximum energy fixedly located at distances from each other which are functions of altitude, and means carried by said craft to receive said radiant energy and to determine therefrom the timing of the successive maxima received as the aircraft moves through said pattern.

5. In a craft, a receiving system for receiving radiant energy signals forming an interference pattern in space, which comprises a radio receiver responsive to received radiant energy and having means actuated in accordance with the timing of received maxima, means controlled by said last named means and arranged to be compensated for speed of travel of the craft to indicate the time spacing of the maxima.

6. A receiving system for receiving radiant energy signals forming an interference pattern in space, which comprises a radio receiver responsive to received radiant energy and having means actuated in accordance with the timing of received maxima, said means comprising a relay operated in response to said maxima, a space discharge amplifier, means impressing a grid voltage upon said space discharge amplifier proportional to the speed of operation of said relay and an indicator actuated in accordance with the space current of said amplifier.

7. A method for determining altitude which includes the steps of setting up a field of radiant energy above the earth having successive surfaces of maximum energy fixedly located at distances from each other which are functions of altitude and measuring the distance between said successive surfaces at the same altitude and determining from said measured distances said last named altitude.

8. A method of determining from a moving vehicle the distances between successive maxima of an electromagnetic radiated field fixed in space and through which the vehicle is travelling which method includes the steps of picking up energy from said field, indicating the frequency of successive maxima of said energy, indicating the speed of said vehicle and integrating said two indications to provide a direct indication of the ratio of said speed to said frequency to thereby provide an indication of said distance.

9. In an altitude determining system for aircraft, means for setting up a field of radiant energy above the surface of the earth having successive surfaces of maximum energy fixedly located at distances from each other which are functions of altitude, a craft carried receiver, said receiver including means for picking up the energy from said field as the craft traverses said field, an integrating device on said craft including a rotating element, driving means therefor including means for adjusting the speed of rotation thereof to a value which is proportional to the speed of said craft, an indicating device mounted on said rotating element and rotatable therewith, said indicating device being positioned an appreciable distance away from the axis of rotation of said rotating element, and means including said receiver for energizing said indicating device each time the craft passes through one of said surfaces of maximum energy.

10. The system described in the next preceding claim characterized by that the indicating device comprises a lamp mounted behind a luminous screen arranged to retain for a short period of time the visual indications of the successive energized positions of said lamp to show the number of times the craft passes through a surface of maximum energy in a time interval determined by the rate of rotation of the lamp.

11. In an altitude indicating system for aircraft, means for producing an interference pattern in space the points of maxima of which along any given horizontal line above a certain altitude which is below the usual range of altitudes of the airlanes, are separated a distance substantially proportional to altitude, said means comprising a pair of spaced radio transmitters each thereof being arranged to propagate and direct upwardly similarly modulated radiant energy waves of the same frequency, a craft carried receiver for receiving said radiant energy, said receiver including means for demodulating the received energy and means connected to the output of said receiver for measuring the number of maxima traversed by the craft in flight through said pattern.

12. An arrangement as described in the next preceding claim characterized by that the means connected to the output of the receiver for measuring the number of maxima traversed by the craft in flight through said pattern comprises a rotatable member, a driving means for said member arranged to rotate the member at a rate which is proportional to the speed of the craft, a lamp mounted on the rotatable member at a point thereof which is displaced from the axis of rotation of the member, an energizing circuit for said lamp including a relay, said relay being included in the output of said receiver and arranged to be operated to cause the energization of the lamp in response to each maxima traversed by the craft whereby the lamp produces a sequence of visible luminous spots along at least a part of its path of rotation, the number thereof being proportional to the altitude of the craft.

13. In an altitude determining system for aircraft, means for producing a field of radiant energy above the surface of the earth having successive surfaces of maximum energy fixedly located at distances from each other which are functions of altitude, a craft mounted radio receiver responsive to the radiant energy and having means actuated in accordance with the frequency of received maxima as the craft traverses said field, said means including a relay arranged to be operated upon reception of each of said maxima, a rotating member, a lamp mounted on said member, means for energizing said lamp at each actuation of said relay, said lamp being located on said rotating member at appreciable distance from the axis of rotation of said member whereby rotation of the lamp and energization thereof provides a sequence of luminous spots positioned along the path of rotation of the lamp, and means for adjusting the speed of rotation of said rotating member to compensate for the known speed of horizontal travel of the craft through said field so that the number of luminous spots is dependent only upon the distance travelled by the craft between successive surfaces of maximum energy.

14. In an altitude indicating system for aircraft, means for producing an interference pattern in space the points of maxima of which along any given horizontal line above a certain altitude which is below the usual range of altitudes of air lanes, are separated a distance which is substantially proportional to altitude, said means comprising a pair of spaced radio transmitters each thereof being arranged to propagate and direct upwardly similarly modulated radiant energy waves of the same frequency, a craft carried receiver for receiving the radiant energy, said receiver including means for demodulating the received radiant energy, a relay connected to the output of said receiver and arranged to be actuated in accordance with the timing of received maxima as the aircraft traverses said pattern, an indicating means for indicating the number of maxima traversed by the craft comprising a rotatable member, a lamp mounted thereon at a point which is displaced from the axis of rotation of said member, an energizing circuit for said lamp, switching means controlled by said relay for connecting the lamp to the energizing circuit upon each energization of said relay, driving means for said member and means for adjusting the speed of rotation of said member.

ELLISON S. PURINGTON.